United States Patent [19]

Brooks et al.

[11] Patent Number: 5,586,261
[45] Date of Patent: Dec. 17, 1996

[54] METHOD AND APPARATUS FOR INTERCONNECTING SIMILAR NETWORKS USING A NETWORK OF A DIFFRENT TYPE AS A VIRTUAL LINK

[75] Inventors: David P. Brooks, Durham; Owen H. Choi, Raleigh; James C. Fletcher, Cary; John L. Klonowski, Durham; David A. Jones, Raleigh, all of N.C.

[73] Assignee: International Business Machines Corporation, Armonk, N.Y.

[21] Appl. No.: 336,948

[22] Filed: Nov. 10, 1994

[51] Int. Cl.⁶ ................................................. G06F 13/00
[52] U.S. Cl. ............................ 395/200.02; 395/200.12; 395/200.2; 370/401
[58] Field of Search ........................ 370/60, 94.1, 85.13; 395/200, 600, 800, 200.01–200.09, 200.1–200.13

[56] References Cited

U.S. PATENT DOCUMENTS

| 4,827,411 | 5/1989 | Arrowood et al. | 395/600 |
| 4,894,822 | 1/1990 | Buhrke et al. | 370/60 |
| 4,914,571 | 4/1990 | Beratz et al. | 395/600 |
| 5,086,426 | 2/1992 | Tsukakoshi et al. | 370/85.13 |
| 5,142,622 | 4/1992 | Owen | 395/200 |
| 5,224,205 | 6/1993 | Dinkin et al. | 395/200 |
| 5,265,091 | 11/1993 | van Landegeur | 370/60 |
| 5,303,238 | 4/1994 | Brodd et al. | 370/94.1 |
| 5,426,637 | 6/1995 | Derby et al. | 370/85.13 |
| 5,432,907 | 11/1995 | Pirazo, Jr. et al. | 298/200 |
| 5,490,252 | 2/1996 | Macera et al. | 395/200.01 |

OTHER PUBLICATIONS

APPN Dependent LU Requester Architecture, D. Bryant et al (IBM).

*Primary Examiner*—Christiopher B. Shin
*Attorney, Agent, or Firm*—Jerry W. Herndon

[57] ABSTRACT

A method and apparatus for interconnecting first and second networks that use the same protocols for communications by a third network. The third network is defined in the first and second networks as a single virtual communications link of the native type used by the first and second networks. In response to requests from initiating nodes in the first and second networks to communicate with destination nodes in the other of the first and second networks, routing computation services in the first and second networks compute routes through the first and second networks that will connect the originating and destination nodes and that include the virtual link as such a route. The virtual link is also used to remotely support the communication needs of dependent nodes in the first and second networks that do not have the ability to establish communications sessions within the networks on their own.

2 Claims, 6 Drawing Sheets

METHOD AND APPARATUS FOR INTERCONNECTING SIMILAR NETWORKS USING A NETWORK OF A DIFFRENT TYPE AS A VIRTUAL LINK

TECHNICAL FIELD

The invention relates to networking in general and to the integration of computer networks of different types. In particular, it relates to communications between networks of similar type, using the resources of networks of a different type. The preferred embodiment relates to interconnecting networks which use IBM's Advanced Peer-to-Peer Networking Architecture using resources of IBM's sub-area SNA networks.

BACKGROUND OF THE INVENTION

System Network Architecture (SNA) sub-area networks have been in extensive use since the early 1970's and at present form a major part of existing corporate and government networks. Sub-area networks are essentially hierarchical in nature. A host node, controlled primarily by IBM's Virtual Telecommunications Access Method (VTAM) controls all of the resources, message routing, resource location and access, etc. to other sub-area networks within a domain. A domain is defined as a portion of a network consisting of one or many nodes and resources all of which are under the direct control of a VTAM at a host node for the domain.

More recently, IBM introduced its Advanced Peer-to-Peer Networking (APPN) architecture. APPN is fundamentally different from sub-area networks. An APPN network is made up of one or more network nodes (NN) and one or more end nodes (EN). Every NN can communicate with any other NN in an APPN network on a peer-to-peer basis. That is, there is no notion of a host that controls all of the resources of a domain. Every NN of an APPN network is equal in status to every other NN of the network. EN's, which are typically user terminals, printers and so on, are served by the NN's. Specifically, each EN is served by one NN. For example, if an application or user at an EN wishes to communicate with another application or user somewhere in the APPN network, the EN uses the resources of its serving NN to locate and communicate with the desired other application or user.

Because sub-area networks are in extensive use and will be so for many years to come, there is a need to provide ways for users to integrate their new APPN networks as they are introduced with their new or existing sub-area networks. One way of accomplishing this is by means of gateway nodes. U.S. Pat. No. 4,914,571 entitled LOCATING RESOURCES IN COMPUTER NETWORKS and issued to Baratz et al on Apr. 3, 1990 describes the methods of locating resources in an APPN network. U.S. Pat. No. 5,224,205, entitled METHOD OF COMBINING FLAT AND HIERARCHICALLY STRUCTURED COMPUTING NETWORKS INTO A SINGLE NETWORK and which issued to Dinkin et al on Jun. 29, 1993 describes algorithms performed at a gateway node for extending a search in an APPN network into a sub-area network. These patents are incorporated herein by reference in their entirety. Numerous other patents describe various inventions related to gateway functions interconnecting different networks. For example, U.S. Pat. No. 5,142,622, entitled A SYSTEM AND METHOD FOR INTERCONNECTING APPLICATIONS ACROSS DIFFERENT NETWORKS OF DATA PROCESSING SYSTEM issued to Owens on Aug. 25, 1992 and describes a gateway function for interconnecting TCP and sub-area networks. Additionally, routers also can be used to perform simpler and less flexible interconnections between networks of different types.

While all of these known methods of integrating networks provide great flexibility to network owners, additional capability is needed to increase further the utilization and integration of networks. This has the advantage of allowing the utilization of existing resources with new networking technologies and the resultant savings accompanying such enhanced integration.

SUMMARY OF THE INVENTION

The invention is a method and apparatus that implements the method of interconnecting first and second networks that use the same protocols for communications by a third network. The third network is defined in the first and second networks as a single virtual communications link of the same kind that the first and second networks recognize. This virtual link is also defined in the first and second networks as being located between a specified node of the first network and a specified node of the second network. In response to requests from initiating nodes in the first and second networks to route messages to destination nodes in the other of the first and second networks, routing computation services in the first and second networks compute routes through the first and second networks that will connect the originating and destination nodes. For message interchanges between nodes that reside in both of the first and second networks, these routes may include the third network. The routing services treat the third network simply as a homogeneous link between nodes of the first and second networks. This arrangement offers great flexibility and savings for network owners that have a plurality of different types of networks, in that different ones of the networks may be used as access routes to others of the networks, without the necessity of installing real links that are native to the end networks being connected.

The third network may be of arbitrary complexity. That is, it may comprise any number of nodes and routes between the nodes. In the preferred embodiment, the third network is an IBM sub-area type of network. A feature of the invention is that, in the establishment of a communication between the first and second networks, using the virtual link, preferred routing between the nodes of the third network for the session is automatically achieved by the existing routing algorithms in the sub-area network. This greatly benefits network owners, as it tends to reduce the cost of networks that the owner must acquire.

In accordance with another feature of the invention, the virtual link can be used to establish control sessions between nodes in the first and second networks that are used to service dependent logical units in these networks. Dependent logical units are nodes which are unable on their own to initiate the establishment of communications to other nodes of the first and second networks. Traditionally, such dependent nodes are owned by a host node that is adjacent to the dependent nodes and provides services to it, such as establishing communications between the dependent nodes and other nodes. This feature of the invention allows a remote node to act as the owner of dependent nodes. The owner can reside in the first or second network and represent dependent nodes in the other of the first and second networks. Control communications are accomplished between the owning node and the dependent nodes via the virtual link implemented in the third network. The owning node uses the virtual link to identify network addresses of dependent nodes to other nodes in the first and second networks that wish to communicate with the dependent node, and the control communication session on the virtual link is used to transmit information to other nodes in the first and second networks for the purpose of allowing data communications sessions to be established directly between dependent nodes and other nodes. This use of the virtual link to support dependent nodes is also of great value to network owners and has not heretofore been possible.

DETAILED DESCRIPTION

Figure 1:
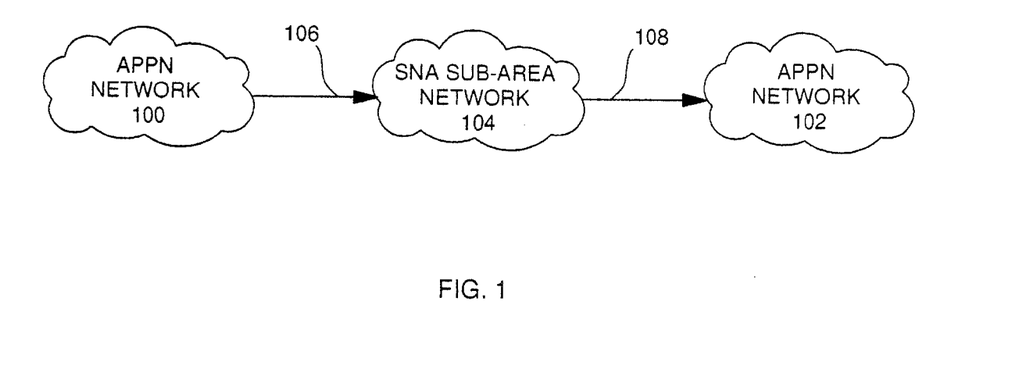
FIG. 1 shows a simple view of two APPN networks interconnected by a sub-area network; each network is represented by a cloud.

FIG. 1 shows two illustrative APPN networks identified as 100 and network 102, interconnected by a sub-area network 104. All of the networks are represented as clouds. As will be seen, the invention allows the use of a subarea network of arbitrary complexity to be used as a virtual transmission route between the APPN networks. Further, as will be seen, communications between APPN networks 100 and 102 will be accomplished between the boundaries 106 and 108 using enhanced sub-area routing within the sub-area network 104 which is unknown to the APPN networks. Thus, efficient routing is achieved automatically within the sub-area between the APPN networks without any effort on the part of the APPN networks. Also, in accordance with a feature of the invention, unintelligent dependent logical units (DLU's) in the APPN networks can be serviced by owners in the network that are not directly attached to and do not directly control the DLU's. This servicing of DLU's is also accomplished by special control sessions established within the VRTG.

Figure 2:
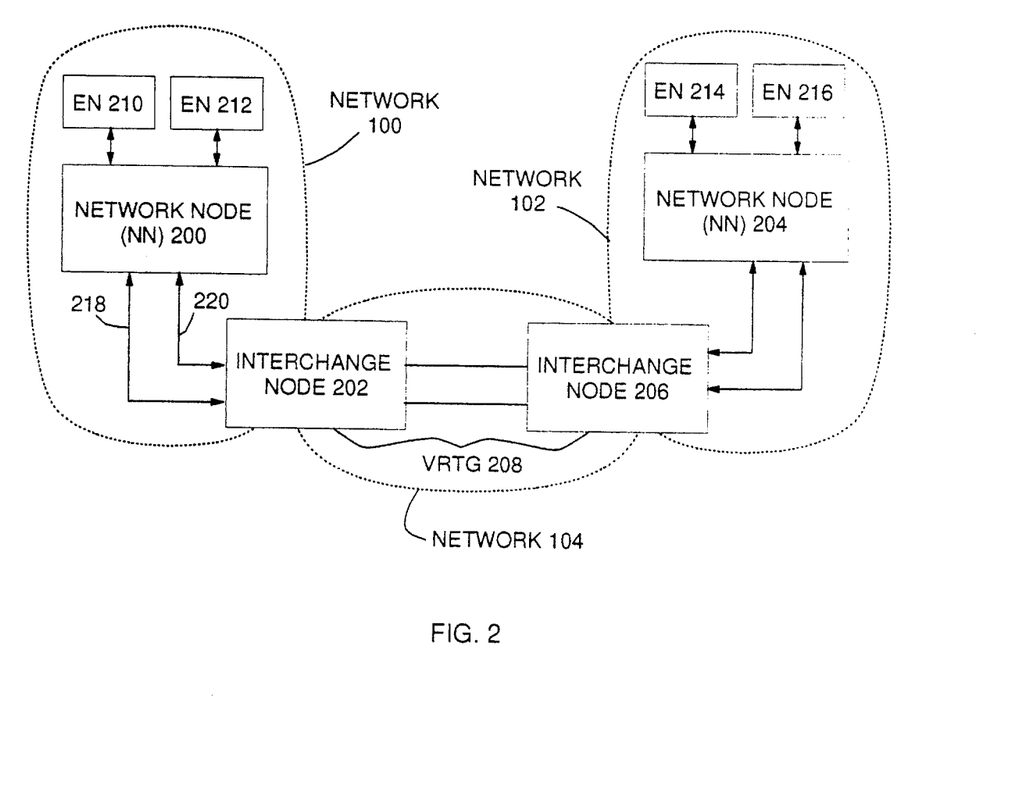
FIG. 2 shows the integrated networks of FIG. 1 in slightly greater detail and particularly shows the sub-area network cloud of FIG. 1 replaced with a conceptual APPN transmission facility called a Virtual Route Transmission Group (VRTG) interconnecting the APPN networks.

Both sub-area networks and APPN networks are at this point in time well-known and understood by skilled artisans in the networking art. Numerous publications are available to the public describing these types of networks. As examples, reference is made to the IBM publication VTAM NETWORK IMPLEMENTATION GUIDE, SC31-6494, for teachings of sub-area networks and to IBM publications SYSTEMS NETWORK ARCHITECTURE ADVANCED PEER-TO-PEER NETWORKING, ARCHITECTURE REFERENCE, SC30-3422, and APPN ARCHITECTURE AND PRODUCT SUPPORT IMPLEMENTATIONS TUTORIAL, GG24-3669, for similar information regarding APPN networks. In FIG. 2, further illustrative details of the APPN networks 100 and 102 are shown; subarea network 104 is conceptually shown as consisting of a portion of an interchange node 202, a virtual route transmission group (VRTG) 208 interconnecting nodes 202 and 206 and a portion of interchange node 206. The interchange nodes are actually hybrid nodes in the sense that both contain an APPN component and a sub-area component. That is, both nodes can recognize APPN message flows and sub-area message flows and react to both types of flows in appropriate ways. As shown in FIG. 2, the APPN components of nodes 202 and 206 can conceptually be regarded as residing in the APPN networks 100 and 102, whereas the subarea components of nodes 202 and 206 can be regarded as residing in the sub-area network 104. To illustrate this conceptually, the APPN network clouds 100 and 102 are shown to intersect both of the interchange nodes along the VRTG end boundaries such that an APPN network includes part of an interchange node and the sub-area network 104 includes part of each interchange node. By way of example, APPN network 100 is also assumed to include a network node (NN) 200. Similarly, APPN network 102 is assumed to include NN 204. Both NN's 200 and 204 are assumed to serve their respective end nodes (EN) 210, 212 and 214, 216. The interchange nodes 202 and 206 thus resemble gateway nodes in some respects.

In an APPN network, each NN maintains a topology database which identifies the location and address of other NN's in the network. The APPN distributed topology database is described in U.S. Pat. No. 4,827,411, which is entitled METHOD OF MAINTAINING A TOPOLOGY DATABASE and issued to Arrowood on May 2, 1989. Because of the topology database, each of the NN's 200 and 204 know of each others existence and address, and each can locate a resource by name that resides in the other NN by means of the APPN resource location algorithm described in the aforementioned U.S. Pat. No. 4,914,571. How this is accomplished with a sub-area network separating the APPN networks is a feature of the invention and is described below. Both of the NN's 200 and 204 know that a route (an APPN route as far as they are concerned) exists between them; this is the VRTG 208. NN 200 knows that the route to NN 204 is via interchange node 202 and 206. Similarly, NN 204 knows that the route to NN 200 is also via interchange node 206 and 202. Neither of the NN's 200 and 204 know anything else about the subarea network 104 or the VRTG 208 other than an APPN route exists between NN 202 and NN 206. Within the VRTG, there can exist many logical unit to logical unit (LU—LU) sessions between resources within the APPN networks 100 and 102. A session is nothing more than a communication path, such as 218 and 220, between the NN's 200 and 204. For the network of FIG. 2, these sessions can only be LU—LU sessions for communicating between logical units in APPN networks 100 and 102 and logical units in the APPN portions of the interchange nodes 202 and 206. As will be seen later in this description, when other components are added to the networks of FIG. 2, it becomes possible also to establish sub-area type control sessions through the VRTG, which can be used for controlling session establishment and communications between unintelligent types of nodes such as terminals and other applications or resources.

Figure 3:
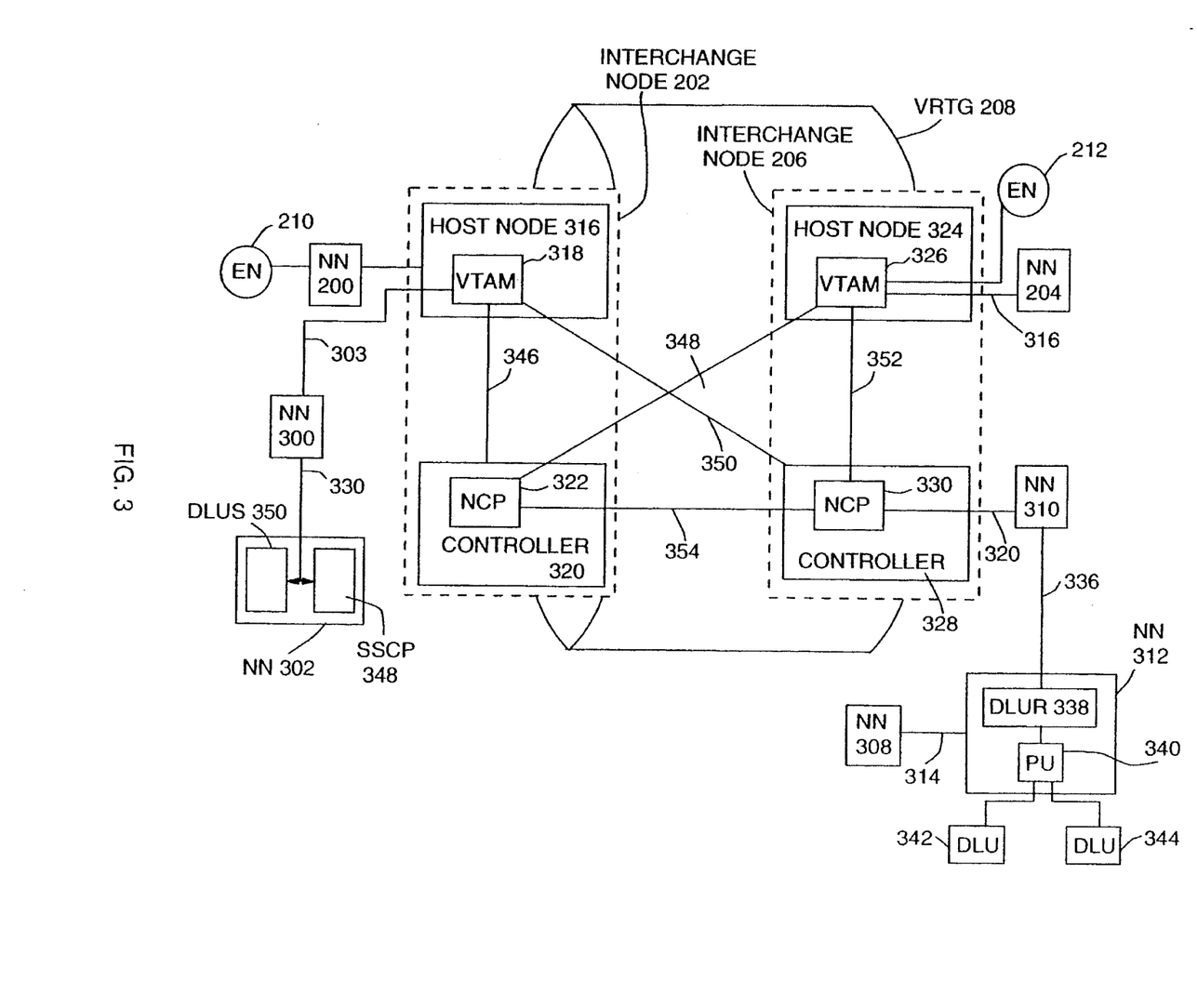
FIG. 3 shows FIG. 2 in more detail and in which illustrative nodes of the sub-area network (and therefore the VRTG) are shown.

FIG. 3 shows an expanded version of FIG. 2, in which additional APPN NN's are added in both of the APPN networks 100 and 102. In addition to NN's 200 and 204, network 100 is now assumed to include NN's 300 and 302, connected to each other via links 303 and 330. APPN network 102, in addition to NN 204, now includes NN's 308, 310 and 312. Both NN's 200 and 300 connect to interchange node 202 and thus to VRTG 208. In APPN network 102, NN's 204 and 310 connect to interchange node 206 and thus also to VRTG 208. FIG. 3 also shows an illustrative node and routing configuration within sub-area network 104. Any route through sub-area network 104 can be used as a VRTG route for communications between the APPN networks 100 and 102, without any knowledge of the specific route on the part of the APPN networks. Interchange node 202 is shown to comprise a host node 316 which accommodates a Virtual Telecommunications Access Method (VTAM) software module 318. The host node 316 is connected to a communications controller 320 which is running a Network Control Program (NCP) 322. Interchange node 206 is illustratively configured in a similar manner with a host node 324 running a VTAM program 326 and communicating with an NCP program 330 at controller 328. Sub-area communication routes are assumed to exist between each of the VTAM's and the NCP's. In this figure VRTG 208 consists of the sub-area portions of interchange nodes 202 and 206, the controllers 320 and 328 and all of the sub-area routes 346, 348, 350, 352 and 354. It should be noted that this configuration of VRTG 208 is completely arbitrary. A single sub-area network of virtually any complexity could be used in place of the illustrative network here.

As mentioned, as far as the APPN networks 100 and 102 are concerned, VRTG 208 is a routing entity between them. Thus, for example, if a user or application at end node (EN) 210 of APPN network 100 issues a request to communicate with a user or application located at EN 212 in network 102, EN 210 requests its NN server 200 to locate and establish a conversation with the desired EN 212. (A conversation is a logical communication facility existing on a session between applications or end users). Such a conversation exists only for the duration of the communication between the end users or applications, whereas the session may last indefinitely and be reassigned to other conversations when idle. In response to the request from EN 210, NN 200 queries its topology database according to the teachings of the Arrowood and Baratz patents to determine if it knows the location of EN 212. If so, it establishes a conversation to the resource according to known practices. If NN 200 does not have a listing for the desired resource, it issues a LOCATE message to the network to find the resource. All of this is in accordance with the aforementioned patent teachings and will not be discussed in detail here. Ultimately, an acknowledge message is returned on the network to the node initiating the LOCATE search identifying the desired resource as being located at EN 212. The resource is then added to the topology directory (described in the Baratz patent) of NN 200 and a LU session and conversation to the resource is initiated. The search path to be used is determined using conventional APPN topology services of NN 200.

In accordance with the invention, the establishment of the conversation to the resource at EN 212 may be via the sub-area network 104 by means of VRTG 208. APPN treats a VRTG as a mere APPN link. Thus, in an updated topology database, there will be appropriate link entries in the database at each of the NN's which describes one or more routes to other NN's, which routes include VRTG 208.

An updated state of the topology database for the illustrative network of FIG. 3 is shown in Table 1. Each of the NN's of networks 100 and 102 and the APPN portions of interchange nodes 202 and 206 contain a copy of this database. For simplicity, it is assumed that VRTG 208 is already known in the APPN networks and that therefore, VRTG 208 is listed as a link in the database. See, for example, entries 1 and 2 of Table 1.

TABLE 1

Network Topology Database

| Entry | Beginning NN | Link | Ending NN |
|---|---|---|---|
| 1 | 202 | 208 | 206 |
| 2 | 206 | 208 | 202 |
| 3 | 300 | 303 | 202 |
| 4 | 202 | 303 | 300 |
| 5 | 200 | 309 | 202 |
| 6 | 202 | 309 | 200 |
| 7 | 206 | 316 | 204 |
| 8 | 204 | 316 | 206 |
| 9 | 206 | 320 | 310 |
| 10 | 310 | 320 | 206 |
| 11 | 310 | 336 | 312 |
| 12 | 312 | 336 | 310 |
| 13 | 312 | 314 | 308 |
| 14 | 308 | 314 | 312 |
| 15 | 300 | 330 | 302 |
| 16 | 302 | 330 | 300 |

Each link in Table 1 has two entries as described in the Arrowood patent, one entry for each direction of communication between the nodes attached to a link. When an application at EN 210 makes a request to its serving NN 200 to establish a conversation with an application at EN 212, NN 200 interrogates its topology database (including portions of the database not shown relating to resources), but does not locate an entry for the desired resource at EN 212. NN 200 therefore broadcasts a LOCATE request to all of its adjacent NN nodes to locate the resource. In FIG. 3, this request goes to interchange node 202. Interchange node 202 searches its resources and fails to locate the requested resource. It therefore propagates the LOCATE request to its adjacent NN's. These include NN 300 and interchange node 206. Interchange node 202 contains the same topology database as shown in Table 1. Therefore, from entry 1 in this database, interchange node 202 knows that an APPN link (VRTG 208) exists to interchange node 206 on which the LOCATE request is transmitted to interchange node 206. In this example, interchange node 206 is the serving NN for EN 212 where the desired resource is located. This means that the directory database at interchange 206 also contains information about the desired resource at EN 212. This level of detail regarding the directory database is not required to understand the invention and is not shown herein. Therefore, after receiving the LOCATE request from interchange node 202, interchange node 206 eventually returns a found acknowledgment message, which propagates back to NN 200 giving the location and route of the desired resource. NN 200 then updates its directory database and calculates the session route using its topology database information; it then proceeds to establish a LU—LU session between the LU's representing the requesting application at EN 210 and the resource at EN 212. At some time thereafter, a conversation is established on the session between the EN entries that wish to communicate, all in accordance with known principles for SNA and APPN.

Thus, in accordance with the invention, communications between APPN networks is established using existing sub-area facilities and sub-area links. Once the interchange nodes are provided that contain the ability to process both APPN messages and sub-area messages, then sub-area VRTG's can treated as simple APPN links in the APPN topology database, and existing sub-area networks can then be used as communication links between APPN networks. Further, the APPN nodes need not concern themselves with efficient routing of messages through a VRTG. This is achieved for free by virtue of the standard sub-area routing methods which have been in use for a number of years. Interchange nodes that provide both APPN and sub-area processing functions became available for commercial use with the release of IBM's VTAM Version 4 Release 1, which occurred in 1993. Use of this VTAM and its characteristics are now well known throughout the SNA industry. VTAM Version 4 Release 1 did not permit the use of VRTG's as described within. Rather, this VTAM allowed the use of a true gateway node between an APPN network and a sub-area network as described in the Dinkin patent.

Figure 4:
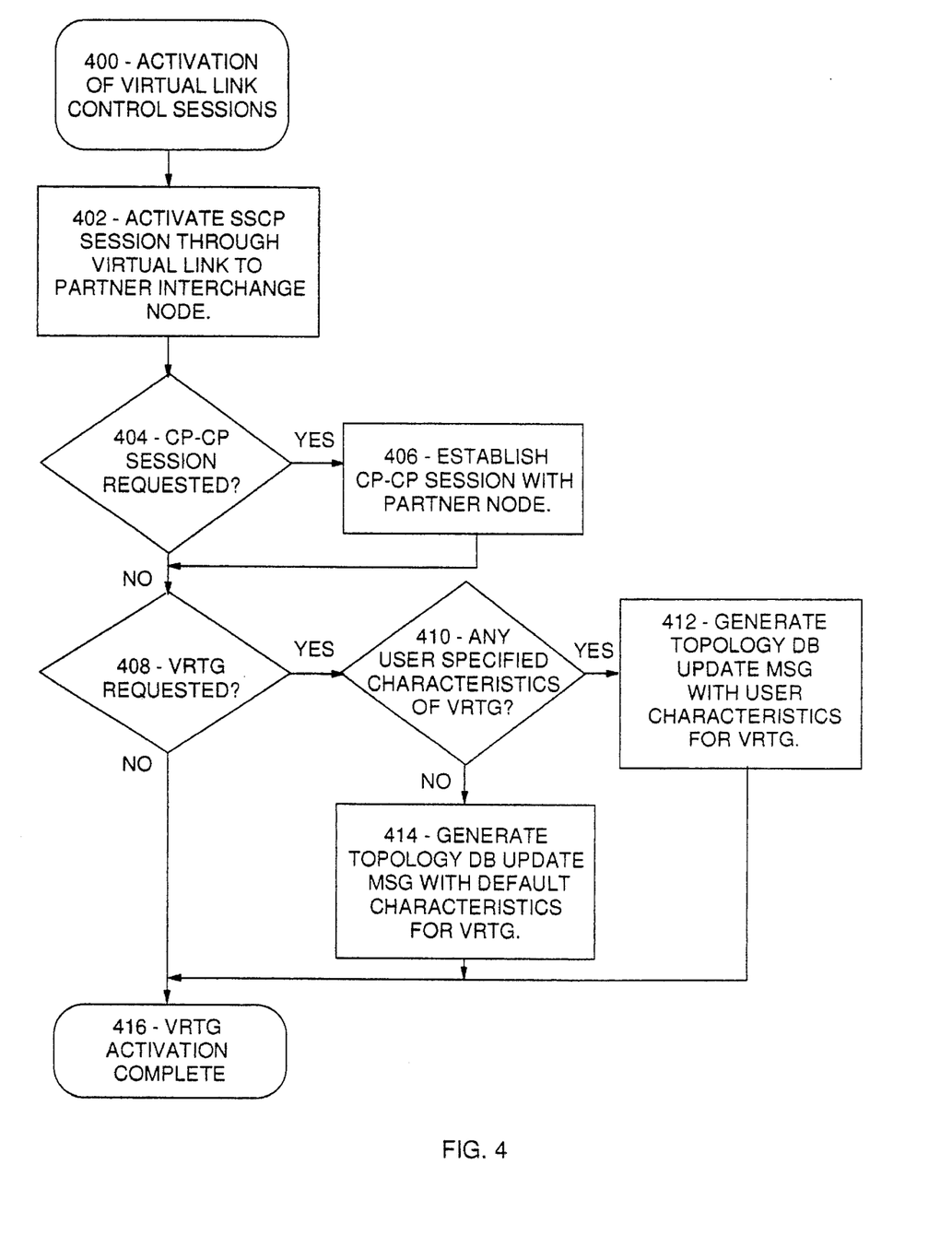
FIG. 4 shows a functional flowchart executed in the overall network to activate the VRTG as an APPN routing link between the APPN networks.

FIG. 4 shows a functional flowchart of the process of activating a VRTG, such as 208, in a network system. Activation occurs as a result of system definitions that are interrogated when a VTAM program at an interchange node is first activated, or as a result of VTAM operator requests made at a later time after VTAM activation. In either case, activation of the VRTG begins at the activation entry point 400 of FIG. 4. For example, assuming that VTAM 326 at interchange node 206 is already active when VTAM 318 at interchange node 202 is being brought up, and assuming further that system definitions at node 202 instruct the node to establish VRTG 208 when VTAM 318 is activated, then the VRTG activate process in FIG. 4 is called at an appropriate point in the VTAM activation process. Step 402 first activates a sub-area System Services Control Point (SSCP) session between node 202 and node 206. This is accomplished in the conventional manner used in all sub-area networks for establishing SSCP sessions. SSCP sessions are sub-area control sessions that are used for communicating between sub-area host nodes for determining routing between various components of the domain of the host node and other control functions. This SSCP session can follow any route in the sub-area network 104 that is determined to be preferred at startup time. Step 404 determines from the system definitions or operator request if a Control Point to Control Point (CP—CP) session is also requested to be setup between node 202 and node 206. This function must be requested to use VRTG 208 as a link between APPN networks, for reasons described below. A CP—CP session is an APPN session that is used for control functions in an APPN network. Although network 104 is a sub-area network, because both of the interchange nodes support both APPN and sub-area functions, it is also possible to have a CP—CP session between these interchange nodes that uses any desired route within network 104 between the nodes.

It is only necessary to establish a CP—CP session between the interchange nodes as described above to use VRTG 208 as an APPN link. This CP—CP session can reside on a separate APPN link that directly connects the interface nodes, if desired. Every message flow originating from the APPN networks or the APPN portions of the interchange nodes that flow on VRTG 208 is an APPN flow that uses the CP—CP session, except for one. The latter sub-area message is only used when an LU—LU session is being established through the VRTG for the purpose of obtaining an address of the exit link from the VTAM at the other end of the VRTG. Arrangements could have been made to obtain this information via a CP—CP session through the VRTG. However, it proved to be more efficient for code reuse to use existing sub-area SSCP—SSCP session establishment and algorithms. In any event, assuming that CP—CP session establishment is requested at step 404, then step 406 establishes the CP—CP session with interchange node 206 in a conventional manner.

Step 408 next determines from the system definitions or operator request whether an APPN VRTG link should be defined between the interchange nodes 202 and 206. If the answer is no, then activation of VTAM for purposes here is complete at this point. Of course, in this event no VRTG would exist or be known to the VTAM. Step 410 determines from system definitions supplied by the network owner whether there are special characteristics that the VRTG must accommodate. Such user specified characteristics include, for example, whether the VRTG link is to be secure and whether tolerance limits should exist such as data transmission speed and delay through the link. Such factors determine the preferred route for LU—LU sessions using the VRTG. If such user specified characteristics exist, step 412 generates a topology update message, including the characteristics, and broadcasts the update message to all adjacent NN's in the system. These would be for this example, interchange node 206, and NN's 200, and 300. And these nodes propagate the update message to their adjacent NN's according to the teachings of the Arrowood and Baratz patents to establish the VRTG entries in the topology database, as described with respect to Table 1. If there are no user specified characteristics for the VRTG, then step 414 broadcasts the update message using default characteristics. At this point, the VRTG is known to all NN's in APPN networks 100 and 102 and can be used by such nodes for establishing communications between the networks as if the sub-area network is a simple APPN link.

In accordance with another feature of the invention, the use of a VRTG to assign remote ownership of dependent logical units (DLU's) and to support communications between such DLU's over APPN networks using VRTG's is now described. A dependent logical unit (DLU) can represent a relatively unintelligent end unit, such as a 3270 terminal, which does not have the capabilities to, for example, initiate sessions with other nodes on its own. Traditionally, such types of unintelligent nodes had to be adjacent to its owning node and rely on the owning node for services, such as establishing sessions to other applications. For example, typically a DLU logons onto its owning host and identifies an application with which it wishes to communicate. The host has the responsibility of locating the requested application and establishing communications with it on behalf of the DLU. In other words, the owning host acts as a controlling intermediary between the DLU and the rest of the network. This means that data paths between the DLU and the rest of the network also have to traverse the owning host or a communication controller attached to the host. This, in turn, means that in APPN networks, even though there may be more direct or shorter routes between a DLU and a session partner, these better routes cannot be used. The feature of the invention described now overcomes these limitations. It allows control sessions to be established over a VRTG that are used for various control communications between a DLU and a remote owner node. Further, after control sessions are established, data communications between the DLU's and other applications or resources in the network can be established directly, without the necessity of passing the data communications through an owning node or host node, as is now the case. This, of course, allows much more flexibility and efficiency in the use of network resources such as links.

With reference again to FIG. 3, remote ownership of a DLU is provided by the cooperation of a dependent LU requester module, such as DLUR 338 at one node, in cooperation with a dependent LU server module such as DLUS 350 at another node and the establishment of control sessions between these modules over a VRTG. In the example of FIG. 3, DLUS 350 at NN 302 is the owner of DLU's 342 and 344 served by NN 312. As such, the DLUS 350 node contains a control point module SSCP 348 responsible for responding to LOCATE searches from other nodes for the DLU's. In the resource portion of the directory database (not shown) at other nodes of FIG. 3, DLUS 350 will be stored as the node location of DLU 342 or 344 as LOCATE messages for these DLU's and acknowledgment messages are distributed throughout the overall network of FIG. 3. Therefore, applications in the network wishing to communicate with, say, DLU 342 will send requests to initiate LU sessions with DLU 342 to DLUS 350. DLUS 350 will, in turn, send the requests to DLUR 338, via control sessions established over VRTG 208. Briefly, this entails that control point service management sessions are established between the node 302 containing the DLUS 350 and the node containing the DLUR 338. These are actually special APPN CP—CP sessions that are established in a manner now well known in APPN networks. Of course, in this case, a portion of the CP—CP session runs over VRTG 208 as described earlier in this description. Since DLU's are really sub-area type devices, they require communications by sub-area type flows. Therefore, sub-area SSCP-PU and SSCP-LU sessions must also be established between the DLUS and the DLUR. These SSCP sessions are actually encapsulated in general data stream variables (GDS variables) on the APPN CP—CP control point management sessions. Data on the SSCP sessions is passed between the DLUS and DLUR in these GDS variables as APPN LU 6.2 message flows. GDS variables are described in detail in many IBM publications, including the publication IBM System Network Architecture Formats, GA27-3136. Once an encapsulated message reaches the DLUR 338, it strips the GDS information obtained from APPN flows over the special CP—CP session and then sends the message to appropriate control functions or to the DLU's as required and vice-versa. Independent of these control arrangements with DLU's, data communications over LU—LU sessions between other applications and the DLU's are established directly. This is described in more detail below.

Figure 5:
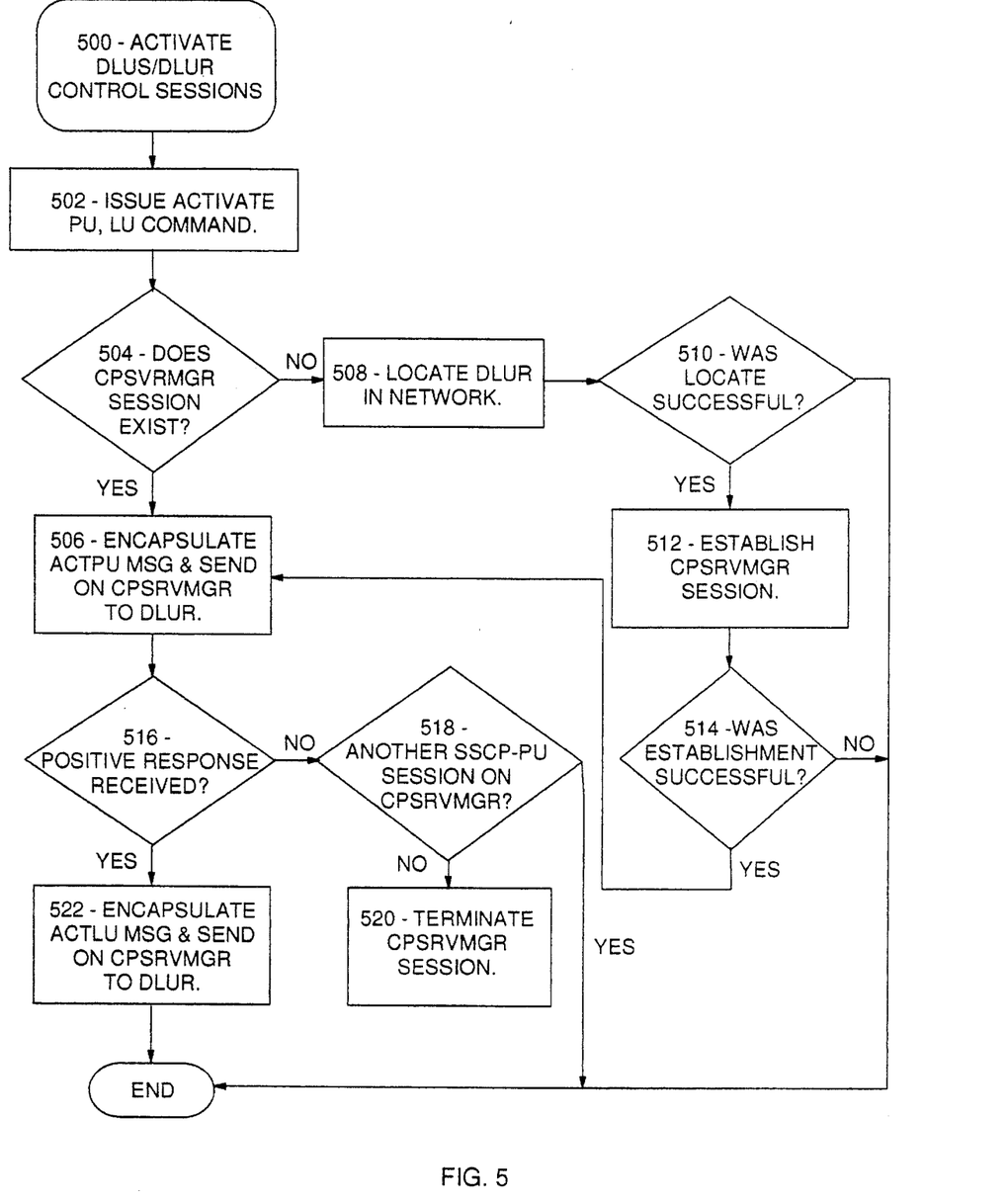
FIG. 5 shows another functional flowchart executed in the network as a whole to activate a special control session between selected nodes of the APPN networks for allowing dependent logical units to be serviced by remote APPN nodes via the VRTG.
Figure 6:
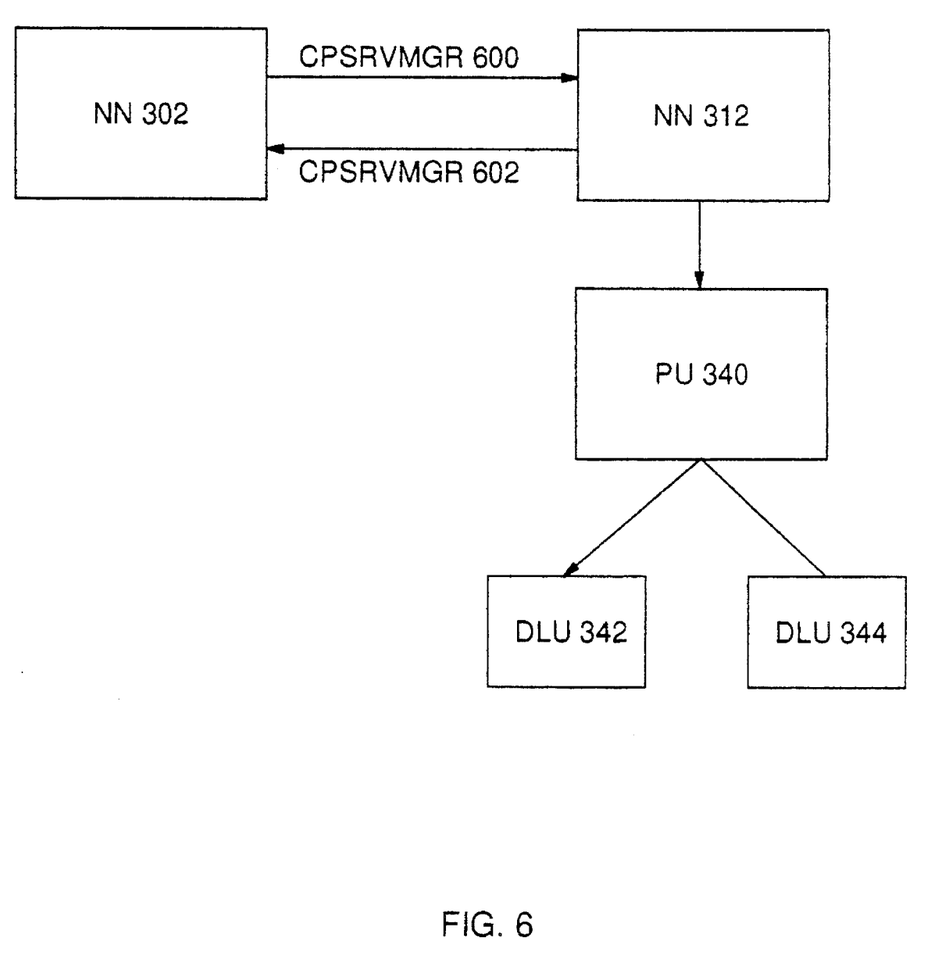
FIG. 6 shows a conceptual view of such special control sessions extending between the APPN networks.

To illustrate this DLUS-DLUR capability, an example is now described in which DLU's 342 and 344 of FIG. 3 are able to communicate directly with applications or users at other nodes of FIG. 3, without themselves having the capability to initiate LU sessions. As mentioned, this ability to act as a remote owner of a DLU is delegated to the DLUS node 302 In this example, DLUR 338 establishes the service management sessions over VRTG 208 to the DLUS 350 at NN 302. Node 302 is an APPN node that also supports both APPN functions and sub-area functions via IBM's well known VTAM. NN 312 containing the DLUR 338 is also an APPN NN that supports both APPN and sub-area peripheral functions. Before direct DLU LU—LU session support can be initiated between network nodes and the DLU's, the CP—CP service management control sessions must first be established between the DLUS and the DLUR. These control sessions can be initiated either as a result of an application at a node requesting an LU—LU session with a DLU, or by an operator at either the DLUS or DLUR nodes. For this example, we assume that an operator at DLUS NN 302 initiates the control sessions. Because NN 302 contains the DLUS support for DLU's 342 and 344, there are system definitions at NN 302 that define the characteristics of these DLU's. This is also true for PU 340 which serves the DLU's. To activate the service management session, the operator at NN 302 activates these DLU definitions by issuing an operator command (ACTIVATE PU,LU) to the node 302 operating system. This request includes the identities of the node 312 that contains the corresponding DLUR 338 with which communication is desired and the identities of PU 340 and the DLU's 342 AND 344 that this session will service. This is illustrated at step 502 of FIG. 5. As a result, DLUS 350 determines at step 504 if a control point service management (CPSRVMGR) session already exists to the DLU's by examining CPSRVMGR control blocks stored at node 302. If a CPSRVMGR session already exists, that CPSVRMGR session can be used to carry the SSCP-PU session now being established. In this event, processing continues with step 506. If no CPSVRMGR session exists, step 508 begins the establishment by initiating a resource LOCATE search. The LOCATE message flows over link 330 to NN 300, thence to the APPN portion of interchange node 202, thence to NN 200 and via the VRTG 208 to interchange node 206, thence to NN's 204 and 310, and thence to NN 312. As a consequence, NN 312 returns a found acknowledgment message containing its identity to the initiator NN 302. The acknowledgment message when it arrives at DLUS 350 will contain the identities of all links that form the route to NN 312. As an aside, if the LOCATE were to fail to locate the resource, the session establishment attempt would be failed. In this case, however, a found acknowledgment is returned. As a result, NN 302 creates the CPSVRMGR session by creating a control block and storing appropriate control information in it, including the routing links to NN 312 obtained from the acknowledgment message. Establishment also includes sending a BIND message to NN 312, to which NN 312 also generates a reciprocal BIND. The reciprocal bind results in the creation of a second CPSVRMGR session flowing in the opposite direction from DLUR 338 to DLUS 350. These BIND steps are standard, well-known APPN message flows. The route traveled by the BIND messages includes NN 300, VRTG 208, NN 310 and NN 312. The route within the VRTG is selected automatically by the sub-area routing methods. Step 514 determines if the BIND messages complete successfully. If so, then the CPSVRMGR sessions are established. A simplified view of this configuration is illustrated in FIG. 6 in which CPSRVMGR 600 represents the first CPSVRMGR session initiated by NN 302 and CPSRVMGR 602 represents that initiated by the reciprocal BIND from NN 312. In accordance with the earlier teaching pertaining to VRTG's, both of these CPSVRMGR sessions travel via VRTG 208 and may take different routes within the VRTG.

Now that the CPSRVMGR sessions are running between the DLUS and DLUR NN's, it remains to activate the DLU's served by DLUR at NN 312. First the PU 340 representing the DLU's must be activated. To accomplish this, at step 506 the SSCP 348 in NN 302 encapsulates a sub-area ACTPU message into a sub-area request unit (RU) and transmits the RU in a GDS variable to DLUR 338 in NN 312 via CPSRVMGR 600. DLUR recognizes the RU as containing an ACTPU message. It strips out the ACTPU message from the RU and forwards it to the intended destination PU 340. This activates PU 340. PU 340 now returns a positive acknowledge message back to DLUR 338 which encapsulates it and forwards it to SSCP 348 over CPSRVMGR 602. Step 516 at SSCP 348 tests for receipt of the positive acknowledgment message. If the ACTPU is unsuccessful, this entire attempt to establish a DLUS for the DLU's is failed. In this case, steps 518 and 520 determine if there is any need to maintain the existence of the CPSVRMGR sessions between DLUS 350 and DLUR 338. Step 518 determines if another SSCP-PU session exists on the CPSRVMGR to a different PU at NN 312. If so the CPSVRMGR session is retained. Otherwise, it is terminated to save resources.

Assuming that step 516 receives a positive acknowledgment to the ACTPU message, the same basic process just described for activating a PU is now performed to activate the desired DLU served by the activated PU, except that this time an ACTLU message is sent to the desired DLU. Step 522 encapsulates the ACTLU message for DLU 342 and sends this message over the CPSVRMGR session to DLUR 338. When DLUR receives this message, it activates an SSCP-LU session to the DLU. All of the control sessions are now established to allow the remote DLUS 350 to act as owner on behalf of the DLU 342.

At this point SSCP-PU and SSCP-LU sessions exist between SSCP 348 and DLUR 338. These sessions run as encapsulated sessions within the CPSRVMGR CP—CP sessions 600 and 602 and can be used to transmit control messages pertaining to PU 340 and an activated DLU such as 342.

Figure 7:
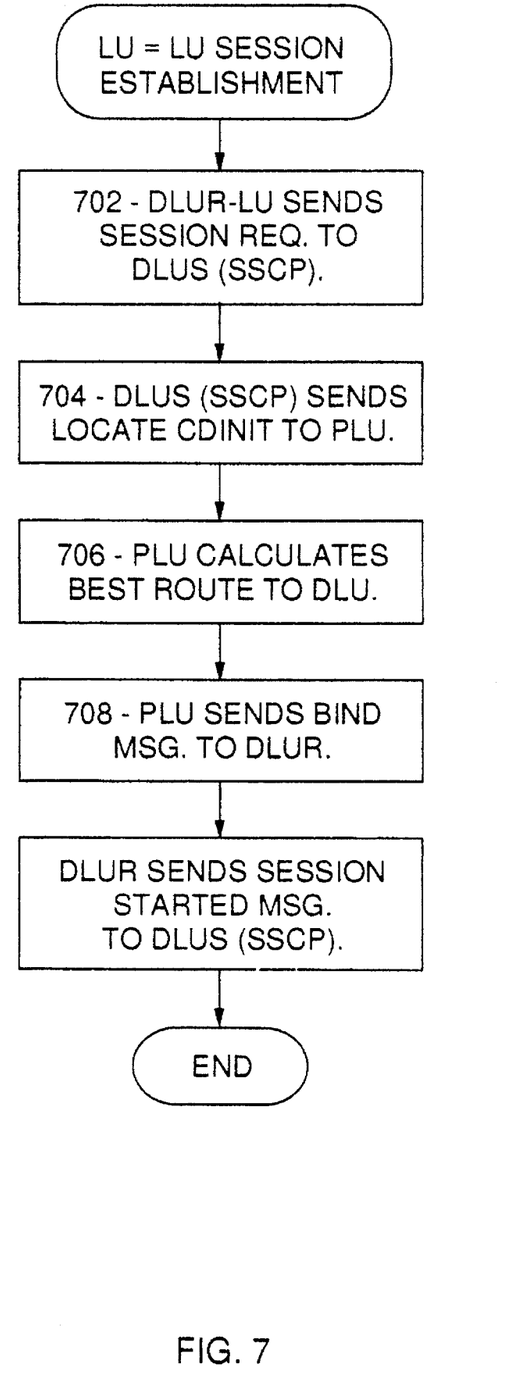
FIG. 7 shows a functional flowchart executed in the overall network for establishing direct logical unit to logical unit data sessions directly between APPN network nodes and dependent logical units elsewhere in the network.

As a result of these encapsulated SSCP control sessions between NN 302 and NN 312, it is now possible to establish direct LU to LU data sessions between an activated DLU and an application somewhere in any of the three networks 100, 102 and 104. As an example, the establishment of an LU—LU session between an application at NN 308 and DLU 342 is now described. It is assumed that DLU 342 wishes to establish an LU—LU session with the NN 308 application. DLU 342 knows the name of the desired application; however, it is assumed that it does not know its location. DLU 342 begins the operation by sending a LOGIN request to its DLUR which forwards it to DLUS 350 and SSCP 348 at node 302 via CPSRVMGR 602. The LOGIN request is encapsulated on an SSCP-LU session of CPSRVMGR session 602. This is illustrated at step 702 of FIG. 7. The LOGIN session request includes the identity of the LU (not shown) representing the application at NN 308 with which DLU 342 wishes to communicate. This desired LU is referred to as a Primary Logical Unit (PLU) because it will eventually initiate the LU session to DLU 342. The LOGIN request is the same type of login request that would be used by a user at a 3270 type of terminal when logging into an application on a sub-area host node. It is a sub-area type of request. When SSCP 348 receives the LOGIN request, it extracts the desired application name from the request and issues a LOCATE request for NN 302 to search its own local resources for the desired application. Since the application is not found among the local resources of NN 302 in this example, SSCP 348 next issues a request to search the APPN network for the application. These LOCATE requests are represented by step 704. This results in NN 302 issuing a LOCATE FIND CDINIT message into the network. This message uses APPN protocols referred to as System Services extensions in the APPN literature that are presently used by APPN to support DLU's in the prior sub-area method. The 'CDINIT' portion of this message stands for Cross Domain Initiate. This indicates that when the application is found, the node containing the application should initiate a LU—LU session with the originator (DLU 342) of the Logon message. For this purpose, the LOCATE FIND CDINIT includes the identity of the NN 312 on which DLUR 338 resides and the identity of the DLU 342. The LOCATE FIND CDINIT request proceeds into the network and eventually traverses VRTG 208 into network 102 in a manner similar to that previously described. Eventually, NN 308 receives the LOCATE FIND CDINIT message, determines that it contains the requested application and responds positively to the LOCATE FIND CDINIT initiator NN 302. NN 308 already knows that a direct link 314 exists between it and NN 312 by virtue of its topology database. NN 308 uses its standard APPN routing functions to calculate a best route (the direct route 314) to NN 312 (step 706) and at step 708 sends a BIND message directly to NN 312 via link 314 to initiate the desired LU—LU session. NN 308 knows the identity of the DLU at NN 312 from the LOCATE message itself which included the DLU identity from the initial LOGON request. NN 312 forwards the BIND directly to DLU 342. In response, DLU 342 returns a positive response to the BIND to NN 308. When the response passes through DLUR 338, DLUR 338 forwards it to NN 308. At step 710, DLUR 338 also initiates a sub-area session started (SESSST) message to SSCP 348 at the DLUS node to inform the DLUS that an LU—LU session now exists to its DLU 342 that does not pass through the DLUS and for which the DLUS has certain administrative responsibilities. At this point, an LU—LU session between the desired application at NN 308 and DLU 342 is active and communications may be sent directly between the application and the DLU. This is a desirable result not heretofore possible and the use of VRTG to accomplish it adds great flexibility for users that own both APPN and sub-area networks.

It is to be understood that the above described arrangements are merely illustrative of the application of principles of the invention and that other arrangements may be devised by workers skilled in the art without departing from the spirit and scope of the invention.

We claim:

1. A network comprising first and second subnetworks of a first type that use the same communication protocols by a third subnetwork of a second type that uses different communication protocols, the network including dependent nodes unable to initiate establishment of communications with other nodes of the first and second networks, the network comprising means in the first and second subnetworks for defining the third network as a native virtual communication link interconnecting a first node of the first network and a second node of the second network, means, responsive to a request from an initiating node in the first network to route a message to a destination node in the second network, for computing a route including the virtual link between the initiating node and the destination node, means in the first and second subnetworks for transmitting the message via the computed route including the virtual link using the communication protocols of the first and second networks, means for assigning a requester node in the first network to act on behalf of a dependent node, means for assigning a server node located in the second network as an owner of a dependent node, means in the server node for identifying a network address of the dependent node to other nodes in the first and second networks wishing to communicate with the dependent node, means for establishing a control communication session between the requester and serve nodes via said virtual link between the first and second networks, and means for transmitting information to other nodes in the first and second networks via the control communication session for the purpose of allowing data communications sessions to be established directly between the dependent node and said other nodes wishing to communicate with the dependent node.

2. A method of interconnecting first and second networks of a first type that use the same communication protocols by a third network of a second type that uses different communication protocols, the first network including dependent nodes unable to initiate establishment of communications with other nodes of the first and second networks, the method comprising the steps of:

in routing tables of the first and second networks, defining the third network as a native virtual communication link interconnecting a first node of the first network and a second node of the second network, assigning a requester node in the first network to act on behalf of a dependent node, assigning a server node located in the second network as an owner of the dependent node for the purpose of identifying a network address of the dependent node to other nodes in the first and second networks wishing to communicate with the dependent node, in response to a request from the requester node, establishing a control communication session within the first and second nodes between the requester and server nodes by computing a route between the requester node and the server node, the route including the virtual link such that said control communication session is routed over the virtual link between the first and second networks, and using the control communication session to transmit information to other nodes in the first and second networks for the purpose of allowing data communications sessions to be established directly between the dependent node and said other nodes wishing to communicate with the dependent node.

* * * * *